INVENTORS.
Jack W. Savage
Ralph K. Shewman
George A. Neyhouse
BY
C. R. Meland
Their Attorney United States Patent Office 3,003,090
Patented Oct. 3, 1961

3,003,090
POWER DRIVE APPARATUS
George A. Neyhouse and Jack W. Savage, Dayton, Ohio, and Ralph K. Shewmon, Centerville, Ohio, assignors to General Motors Corporation, Detroit, Mich., a corporation of Delaware
Filed Apr. 6, 1959, Ser. No. 804,372
6 Claims. (Cl. 318—11)

This invention relates to electric motor drive apparatus and more particularly to electric motor drive apparatus for machines or loads having variable torque demands such as the rotatable container of a washing machine.

In certain types the load during acceleration exhibits a sharp decrease in torque requirement. Thus, for example, in washing machines where the clothes are being tumbled in a tub the torque requirement to accelerate the tub remains substantially constant until the time that the clothes are caused to be thrown tightly against the inner wall of the tub. After the tub speed has been increased to the point where the clothes tightly hug the inner wall of the tub the torque requirement to maintain speed or accelerate the tub drops sharply. It will be apparent to those skilled in the art that electric motor driven loads other than washing machines also exhibit a sharp change in torque requirement during acceleration at a critical speed.

In drive apparatus of the type described it has been common practice to provide a transmission having a plurality of output speeds between the electric motor and the load to provide the required speed and torque for the load. It will be appreciated that when the transmission is shifted the mechanical advantage between the motor and the load is changed and depending upon the torque capability of the motor the load speed will be changed. Where the transmission is shifted to cause an increase in speed of the load there is a corresponding reduction in mechanical advantage which may be, for example, 10 to 1 and a corresponding 10 to 1 increase in motor torque output is required to maintain the load speed and further a greater than 10 to 1 motor torque output is required to accelerate the load. It can be seen that in a device where a transient load exists at a critical speed shifting of the transmission for higher speed output prior to the load attaining the critical speed causes a sharp increase in transient torque requirement coupled with a loss in mechanical advantage of the transmission. The motor in such a situation is then faced with supplying the sharply increased transient torque with a reduced mechanical advantage and to do so must be designed to supply relatively high peak torque.

It is, accordingly, an object of this invention to provide a drive apparatus including an electric motor wherein a pattern of acceleration is provided that eliminates peak motor load requirements. By eliminating peak load or torque requirements motors of nominal torque output may be used and the peak demand for electrical power is reduced.

Another object of this invention is to provide a pattern of acceleration for a drive apparatus including an electric motor and a transmission that drives a load having an essentially constant torque requirement that sharply decreases after a critical speed is exceeded, which includes, accelerating the load through its critical speed by increasing the speed of the electric motor and then shifting the transmission to further increase the speed of the load. It has been found that this greatly reduces the peak torque requirement. It will be observed that with this pattern of acceleration the mechanical advantage of the transmission is not reduced until the load is accelerated past the speed where the decrease in load torque requirement occurs.

A further object of this invention is to provide a motor control circuit for a washing machine of the type having a driving motor and a two-speed transmission for driving the tub of the washing machine at different speeds and wherein the motor is controlled in such a fashion that the tub has its speed increased from its tumbling speed to a predetermined value prior to shifting of the mechanical transmission.

Still another object of this invention is to provide a method of accelerating a load through an electric motor and a mechanical speed changing transmission which includes driving the load at a relatively slow speed, increasing the speed of the motor electrically to effect load distribution and then shifting the transmission to provide a high speed for the load. An important feature of this method and of this invention resides in the fact that the load speed is increased electrically from a low speed before the mechanical shifting of the transmission takes place and this method of operation greatly reduces peak motor torque requirements with the result that motors having relatively low torque output may be used.

Still another object of this invention is to provide a power drive apparatus for the tub of a washing machine or the like which includes a two-speed electric motor and a two-speed transmission connected between the motor and the tub. With this arrangement the tub may be driven at a plurality of speeds thereby providing a washing machine that is versatile in operation while still retaining a drive arrangement that is simple in construction, low in cost and not subject to destructive pulsating torque forces.

A further object of this invention is to provide a power drive apparatus for the tub of a washing machine or the like which includes a two-speed electric motor and a two-speed transmission connected between the motor and tub and wherein a control apparatus is provided for causing the tub to be driven through the transmission at its low speed operation of the motor, and wherein the tub is accelerated to a higher speed by changing an electrical condition of the motor so that it operates at a higher speed and further wherein the transmission is then shifted for still higher speed operation of the tub. With this arrangement it has been found that the torque required to accelerate the tub is greatly reduced over prior arrangements and this reduction in torque requirement is attributable to controlling the motor and transmission so that electrical shifting of the motor to a higher speed takes place before mechanical shifting of the transmission.

Further objects and advantages of the present invention will be apparent from the following description, reference being had to the accompanying drawings wherein preferred embodiments of the present invention are clearly shown.

In the following description, this invention is shown and described as applied to a washing machine but it will be understood that the invention is useful in accelerating any device or load having a transient load condition that appears at a critical speed and which disappears once the load is accelerated through the critical speed.

Figure 1:
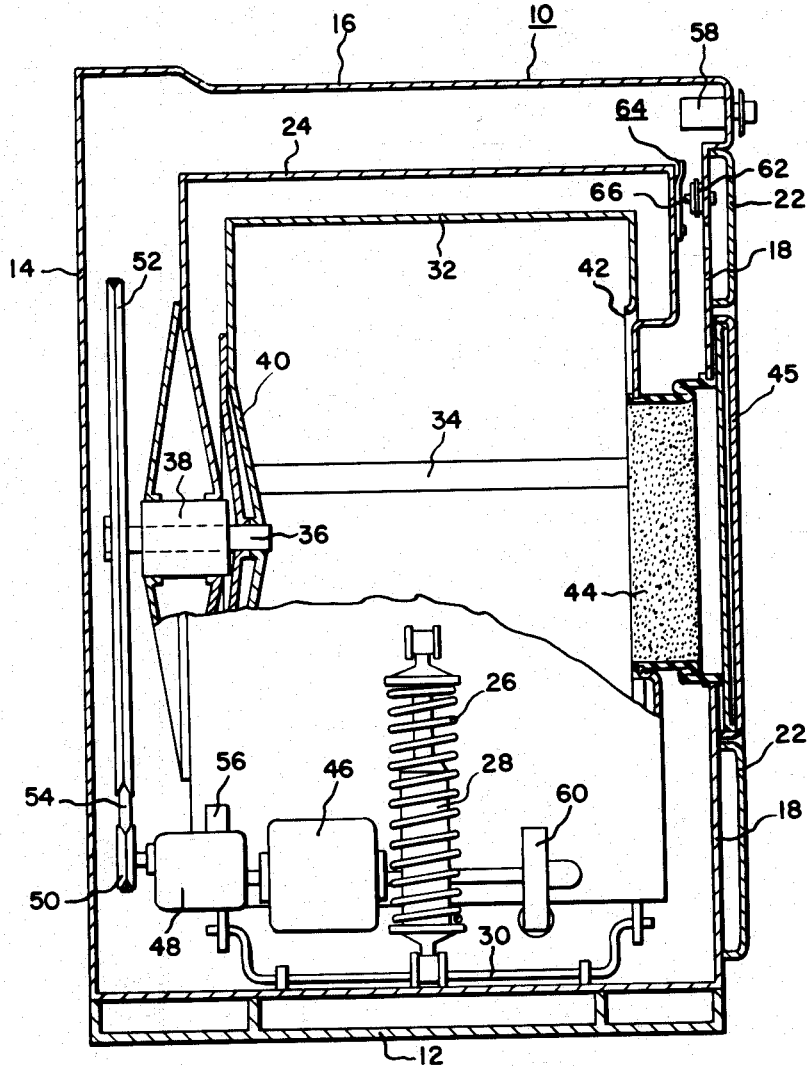
FIGURE 1 is a side view with parts broken away of the laundry apparatus of this invention showing the location of the drive mechanism for controlling the spinning of the tumbling drum of the machine.

Referring now to the drawings and more particularly to FIGURE 1 a laundry machine of the type to which the control circuit of this invention applies is illustrated. The laundry machine may be a combination washer and dryer or may be a washing machine. As shown in FIGURE 1, the laundry machine is generally designated by reference numeral 10 and has a base designated by reference numeral 12. Base 12 supports a cabinet having a rear wall 14, front walls 18 and a top wall 16. A cylindrically shaped horizontally arranged tub 24 is supported from the frame 12 by means of springs 26 and shock absorbers 28 that are interposed between the frame and tub. The springs and shock absorbers are pivoted to the frame and to the tub 24. The shock absorbers and springs are located at opposite sides of the tub and approximately midway the horizontal length of the tub. The shock absorber and spring on the right-hand side of the tub 24, as viewed from the front, is not shown in FIGURE 1 but it is identical with the shock absorber and spring on the left-hand side, which is shown in FIGURE 1. A torsion bar 30 is pivoted in suitable bearings to the main frame 12 and to the tub 24 to substantially prevent front-to-back movement of the tub 24. The springs 26 and shock absorbers 28 serve to prevent transverse or side-to-side motion of the tub 24. The particular suspension arrangement illustrated in FIGURE 1 and described hereinbefore forms no part of this invention and could take any conventional form.

A tumbling drum 32 having a perforate peripheral wall and formed with the usual tumbling vanes 34 is disposed within the tub 24. The tumbling drum 32 is fixed to a shaft 36 that is journaled within a bearing 38 fixed to the rear wall of tub 24. The tumbling drum has a conically shaped rear wall portion 40 as is illustrated in FIGURE 1. The tumbling drum 32 has a front access opening 42 that is in alignment with the front access openings formed in the tub 24 and in front cabinet wall 18. A tubular flexible member 44 made of rubber or the like is interposed between the tub 24 and the front wall 18 of the clothes washer. A door 45 is pivoted to the decorative panel 22 of the washer and abuts a peripheral edge of the flexible tubular member 44 when in a closed position.

The tumbling drum 32 is driven by an electric motor 46 which is secured to tub 24. The electric motor is drivably connected to any well-known solenoid operated two-speed transmission mechanism designated by reference numeral 48. The output shaft of the transmission mechanism is connected with a pulley 50 which drives a pulley 52 by means of a suitable V-belt 54. The pulley 52 is connected with shaft 36 so that rotation of pulley 52 rotates the tumbling drum 32. The two-speed transmission mechanism 48 is ordinarily in a low-speed position and is shifted to a high-speed position whenever solenoid 56 is energized. The clothes washer is preferably provided with suitable water inlet means (not shown) which may be of any conventional type. The water inlet apparatus is controlled by a conventional timer 58 having the usual timer operated switches. The electric motor 46 also drives a pump 60 which operates to exhaust washing fluid from the tub 24 during certain portions of the washing cycle.

In the low-speed de-energized position of solenoid 56 the speed ratio between the motor and tumbling drum 32 is, for example, 40 to 1. This means that the tumbling drum makes one revolution every 40 revolutions of the motor 46. When the solenoid 56 is energized, however, the transmission ratio is shifted such that the ratio is now 4 to 1. With the solenoid 56 energized, the tumbling drum 32 will make one revolution for every 4 revolutions of the electric motor 46. These speed ratios are given by way of example and not by way of limitation and could take other values, it only being necessary that the transmission provide a low-speed operation of the tumbling drum 32 and a high-speed operation of the drum.

The motor 46 may take various forms in accordance with this invention and these forms will be more fully described in connection with FIGURES 2, 3 and 4 in which various control circuits for operating the motor and two-speed transmission are illustrated.

The tub 24, as illustrated in FIGURE 1, is fitted with a switch actuator designated by reference numeral 64 that cooperates with an out-of-balance sensing switch designated by reference numeral 62. The switch 62 is, for example, normally closed and has an actuator button 66 that is at times contacted by the member 64 secured to tub 24. It will be apparent from FIGURE 1 that out-of-balance front-to-back movement of the tub 24 will cause the switch button 66 to be depressed to open the circuit through the switch. The actuator 64 is preferably formed with a cam face such that excessive side-to-side movement of the tub 24 will also cause the switch actuator button 66 to be depressed to open the circuit through the switch 62. Switch 62 and its function with respect to the motor 46 and transmission 48 is described in greater detail in connection with FIGURES 2, 3 and 4. It will be apparent that the unbalance switch might take other forms, it only being necessary that a switch is tripped when the tub 24 violently moves at some predetermined magnitude due to uneven clothes distribution within the rotatable tub 32. These types of switches are well known to those skilled in the art and the particular construction of the unbalance switch forms no part of the present invention with the exception of its use within the control circuits illustrated in FIGURES 2, 3 and 4.

Figure 2:
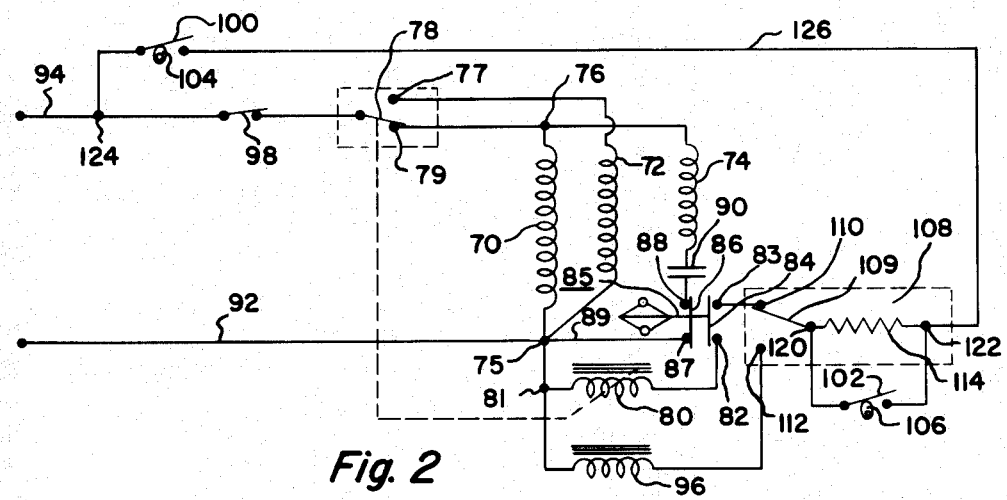
FIGURE 2 is a circuit diagram schematically showing a control circuit for the electric motor and transmission illustrated in FIGURE 1.

Referring now more particularly to FIGURE 2, it is seen that the induction motor in this embodiment is comprised of a four-pole main winding 70, a two-pole main winding 72 and a four-pole phase or start winding designated by reference numeral 74. This motor is of the conventional two-pole/four-pole type having starting ability only as a four-pole machine. In accordance with well-known electrical practice, the motor will have a synchronous speed of namely 1800 r.p.m. during four-pole operation and 3600 r.p.m. under two-pole operation. As a practical matter, the motor will operate at approximately 1725 and 3450 r.p.m., it being kept in mind that other speeds might be selected without departing from the spirit and scope of this invention.

The four-pole main winding designated by reference numeral 70 has one side thereof connected with a junction 75 and has its opposite side thereof connected with junction 76. The two-pole main winding 72 has one side thereof connected with junction 75 and has its opposite side connected with a contact 77 of a relay actuated switch that includes movable contactor 78, the contact 77 and contact 79. The contactor 78 is operated by a relay coil winding designated by reference numeral 80 and having one side thereof connected with junction 81 and an opposite side thereof connected with a contact 82.

The contact 82 is at times connected with contact 83 through a contactor 84 which forms a part of a centrifugal motor switch generally designated by reference numeral 85. The centrifugal switch also includes contact 86 which normally shorts contacts 87 and 88. The contact 87 is connected with junction 75 via a lead 89 whereas the contact 86 is connected with a condenser 90.

The four-pole phase or start winding 74 is connected between condenser 90 and the junction 76, as is clearly apparent from FIGURE 2.

The junction 75 is connected with a lead 92 which is, in turn, connected with a suitable source of A.C. voltage. The lead wire 94 is likewise connected with the source of voltage and it is apparent that the lead wires 92 and 94 form the input leads for the motor and its control circuits. The relay coil designated by reference numeral 96 is the coil that shifts the two-speed transmission 48 illustrated in FIGURE 1, and it is apparent that this relay coil is equivalent to the solenoid 56 illustrated in FIGURE 1. The relay coil 96 controls the operation of the two-speed transmission as has been described in connection with FIGURE 1.

The electric switch designated by reference numeral 98 is the unbalance switch shown in FIGURE 1 and designated therein by reference numeral 62. It will be appreciated therefore that the switch 98 will be normally closed until the tub 24 becomes excessively out of balance whereupon the switch 98 is temporarily opened.

The switches 100 and 102 are timer operated switches which include cams 104 and 106 for controlling the closing and opening of the switches. These cams, as wellknown to those skilled in the art, are driven by a suitable timer motor to control the machine progressively through its cycles of operation. The timer is designated by reference numeral 58 in FIGURE 1, it being understood that the timer of FIGURE 1 will include the electric motor that drives the cams and the various switches that control operation of the laundry apparatus.

A time delay switch is used in the circuit of FIGURE 2 and is generally designated by reference numeral 108. This time delay switch includes a contactor 109 which normally is in engagement with contact 110 but which shifts into engagement with contact 112 after the heater 114 is energized with electrical current for a predetermined length of time. As an example of the time required for the contactor to shift from contact 110 to contact 112, this time may be set at approximately 5 seconds.

As is clearly apparent from FIGURE 2 of the drawings, the transmission shifting solenoid 96 is connected between junction 75 and contact 112. The timer operated contact 102 is connected across junction 120 and 122 and is therefore connected directly across the heater for the time delay switch. The timer contact 100 is connected between a junction 124 and the junction 122 via a lead 126.

In operation and for slow tumbling of the drum 32 the timer operated switch 100 is maintained open as is the timer operated switch 102. This causes the motor to be energized through the unbalance switch 98 through switch contactor 78 and thence through the four-pole main winding 70 and the four-pole start or phase winding 74. During tumbling the motor then starts in its low-speed mode of operation and starts as a four-pole motor, the motor accelerating to a point where the centrifugal switch 86 disconnects contacts 88 and 87 to disconnect the start or phase winding 74. The motor then operates as a four-pole motor on the main winding and the tumbling drum 32 will be driven at roughly 43 r.p.m. due to the fact that the transmission solenoid 96 at this time is not energized so that a 40 to 1 speed ratio is maintained between the motor and the tumbling drum 32 with the motor operating at 1725 r.p.m. This portion of the cycle is frequently called the wash cycle wherein the clothes are tumbled within the tumbling drum 32 at slow speed, it being understood that the tub 24 has previously been supplied with a washing liquid.

When it is desired to drive the tub 32 through an intermediate or low speed spin cycle, the timer contacts 100, and 102 are caused to be closed. The centrifugal switch at this time has disconnected the contacts 88 and 87 and is connecting contacts 82 and 83 due to the fact that the switch is designed to open contacts 87 and 88 at approximately 1500 r.p.m. and is designed to maintain the contacts 82 and 83 connected and contacts 88 and 87 disconnected until the speed drops to approximately 1300 r.p.m. It will be appreciated that the intermediate spin cycle follows immediately after the tumbling cycle so that the rotational speed of the tumbling drum and motor upon the rapid timer switching will be maintained sufficiently high to keep contacts 82 and 83 shorted. With contacts 83 and 82 shorted, a circuit is completed for relay coil 80 which may be traced from line 126, through timer contact 102, through contactor 109, through shorted contacts 83 and 82 and thence through the relay 80 back to line 92. When relay coil 80 is energized, the contactor 78 is disconnected from contact 79 and is connected with contact 77. The shifting of contactor 78 disconnects the four-pole main winding 70 from the circuit and connects the two-pole main winding with the circuit. The motor will now begin to accelerate toward twice its previous speed or to approximately 3450 r.p.m. since it is now connected as a twopole motor rather than a four-pole motor. Since the contactor 109 remains engaged with contact 110 the relay coil 96 is not energized so that the two-speed transmission is maintained in its low speed ratio position. It will be apparent from the foregoing that the speed of the tumbling drum has been increased by changing the number of poles of the motor without changing the transmission 48. In this mode of operation the motor will continue to operate as a two-pole motor at 3450 r.p.m. and the speed of rotation of the tub will be dictated by the two-pole operation of the motor together with the low speed position of the transmission. The operation will continue as long as timer contacts 100 and 102 are closed, and the tub will be rotated at 86 r.p.m.

After the intermediate or low speed spin cycle, the timer motor operates to open timer contact 102 and timer contact 100 remains closed. The opening of timer contact 102 causes current to flow through the heater 114 of time delay switch 108. As has been noted hereinbefore, the time delay switch is designed to have a five second time delay. After the five second interval, the contact 109 will shift from engagement with contact 110 into engagement with the contact 112 to complete a circuit for the transmission shifting relay 96. This will cause the transmission to be shifted from its low speed ratio position to its high speed ratio position. When the contactor 109 shifts into engagement with contact 112, it also opens the circuit for relay coil 80 so that the motor now shifts back to a four-pole operation. This is due to the fact that the solenoid 80 shifts the contactor 78 into engagement with contact 79 to cause the four-pole connection of the motor. The motor will now be accelerated as a four-pole motor on both main and start windings to top spin speed with the transmission shifted to its 4.0 to 1 ratio. This will give an ultimate spin speed of 431 r.p.m. Thus, whenever the timer operated switch 100 is closed and timer operated switch 102 is open, to call for high speed spin of the tumbling drum, the motor is first operated as a two-pole motor for at least five seconds prior to shifting of the transmission to its high speed ratio. It has been found that this greatly reduces the peak torque requirements of the washing machine motor and thus enables the motor to have a nominal torque value. This is due to the fact that with the transmission in its lowspeed ratio, the motor when accelerating as a two-pole motor, distributes the clothes within the tub to go through the sharp torque reduction phenomenon so that the motor torque load is greatly reduced as compared to the situation where the mechanical transmission is shifted before distribution has occurred.

If the tub should become unbalanced to the point of tripping the switch 98, the circuit to the motor is temporarily interrupted as is clearly apparent from an inspection of FIGURE 2. This will, of course, cause the system to coast and permit the unbalance to be corrected. Once the unbalance has been cured, the motor will accelerate once more to a speed dictated by the particular point in the cycle of operation of the washing machine, and this depends upon the position of the timer operated contacts.

Figure 3:
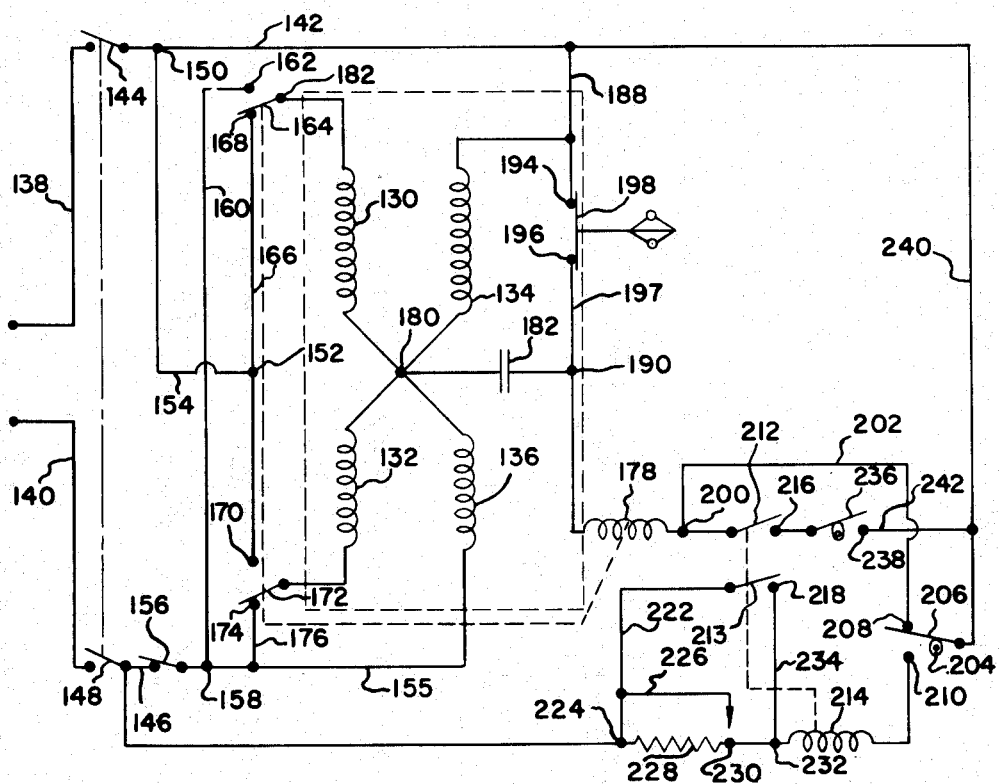
FIGURE 3 is a modified control circuit for the motor and two-speed transmission illustrated in FIGURE 1 and shows an electric motor of the all copper usage type.

Referring now more particularly to FIGURE 3, a circuit for controlling the operation of the drive motor for the washing machine and the transmission shifting solenoid is illustrated. In the arrangement of FIGURE 3, a different type of motor is illustrated for driving the tumbling drum. This induction motor is of the multi-speed type being operable either as a two or a four-pole motor and having all copper usage. The motor as illustrated in FIGURE 3 has windings designated by reference numerals 130, 132, 134 and 136. This motor will operate either as a two-pole or as a four-pole motor but has starting ability only as a two-pole motor. The particular motor illustrated herein is more fully shown and described in copending application S.N. 804,223, filed concurrently herewith.

In the circuit diagram of FIGURE 3, the reference numerals 138 and 140 designate voltage input lines that are adapted to be connected with a suitable source of 115 volt, A.C. voltage. The line 138 is connected with line 142 by a line switch 144. In a like manner, line 146 is connected with line 140 via line switch 148. The line 142 is connected with a junction 150 which is in turn connected with junction 152 via line 154. The line 146 is connected with a lead wire 155 through the unbalance switch 156 which is the equivalent to the switch designated by reference numeral 62 in FIGURE 1. The lead wire 155 is connected with a junction 158 which is in turn connected with lead wire 160. Lead wire 160 is connected with an electrical contact 162 that is at times engaged by relay operated contactor 164. The junction 152 is connected with a lead wire 166 which is in turn connected with contacts 168 and 170. The contact 168 normally engages movable contactor 164 whereas the contact 170 is at times engaged by a movable contactor 172 that normally engages the contact 174. The contact 174 is connected with lead wire 155 via a lead designated by reference numeral 176. The contactors 164 and 172 are controlled by relay coil 178.

The shifting of contactors 164 and 172 operates to change the motor electrically either to a two-pole connection or to a four-pole connection. With the relay 178 deenergized, contactor 164 engages contact 168, contactor 172 engages contact 174 and the windings 130, 132, 134 and 136 are thus connected for two-pole operation. When relay coil 178 is energized to cause a shifting of contactors 164 and 172 into engagement with contacts 162 and 170, the windings on the motor are shifted to a four-pole running connection.

One side of the coil windings 130, 132, 134 and 136 are connected with a common junction 180 as is the one side of motor starting capacitor 182. The opposite side of coil winding 136 is connected with lead wire 155 as is clearly apparent from the drawings. The opposite side of starting motor capacitor 182 is connected with a junction 190 which is connected with lead wire 197. The lead wire 188 is connected with an electrical contact 194 whereas the lead wire 197 is connected with an electrical contact 196. These contacts are at times shorted by a movable contactor 198 which forms part of a centrifugal switch that is driven at motor speed. The lead wire 197 is connected with one side of relay coil 178. The opposite side of relay coil 178 is connected with a junction 200 and this junction is connected to one side of an electrical switch 204 via the lead wire 202. The electrical switch 204 is a timer operated switch and includes movable contactor 206 that alternately engages electrical contacts 208 and 210. It is seen that lead wire 202 is connected with electrical contact 208. The junction 200 is also connected to one side of a relay operated switch having a movable contactor designated by reference numeral 212. The contactor 212 and contactor 213 move together and are operated by the spin shift solenoid designated by reference numeral 214. In this case, energization of the solenoid 214 operates to shift the variable speed transmission from its low speed operation to its high speed operation and also operates to move contacts 212 and 213 into engagement with contacts 216 and 218. When spin shift coil 214 is deenergized, the contactors 212 and 213 remain out of contact with contacts 216 and 218. The transmission that is operated by the coil 214, for example, is designated to provide transmission ratios of 40 to 1 and 8.0 to 1. This is different from the transmission ratios of the FIGURE 2 arrangement.

The contactor 212 is connected with junction 200 whereas the contactor 213 is connected with a lead wire 222 which is, in turn, connected with junction 224. The junction 224 is connected to one side of a thermal time delay switch having a movable contactor 226 and a heating element 228. The thermal time delay switch may be of any conventional design wherein the increase of temperature of heating element 228 causes the contactor 226 to engage an electrical contact 230. For example, this delay switch operates to close the circuit between contactor 226 and contact 230 after the heating element 228 has been energized for approximately five seconds.

The opposite side of the time delay switch is connected with a junction 232 and this junction is connected with one side of the solenoid shifting coil 214 and with contact 218 via lead 234. The contact 216 of the switch that is operated by coil 214 is connected to one side of a timer operated switch having a movable contactor 236 which at times engages fixed contact 238. The contact 238 is connected with lead wire 240 by lead 242. The lead 240 is also connected to one side of timer operated contactor 206 as is clearly apparent from FIGURE 3. The timer operated contacts 236 and 206 control the operation of the motor and transmission in a manner to be more fully described hereinafter. It will be appreciated that these contactors are opened and closed in a predetermined sequence by cams that are driven by a timer motor. The timer is designated by reference numeral 58 in FIGURE 1 and these cams represent certain of the cams that would be contained by the entire timer. Before proceeding to a description of the operation of the circuit illustrated in FIGURE 3, it is to be kept in mind that the motor is a two-pole and a four-pole motor and that, during four-pole operation, the motor operates at approximately 1725 r.p.m. whereas, when the motor is operating as a two-pole motor, its speed is approximately 3450 r.p.m. The centrifugal switch having contactor 198 is designed, for example, to open at 2400 r.p.m. and to close at 1500 r.p.m.

When it is desired to effect a tumbling action of the tumbling drum 32, as during the wash cycle of the machine, the timer operates contact 236 to its open position and contactor 206 is operated to engage contact 208. The closure of contactor 206 with contact 208 short circuits the relay coil 178 so that the motor starts in its two-pole connection with the contactors 164 and 172 contacting respectively the contacts 168 and 174. The motor will thus accelerate as a two-pole motor and will continue such acceleration until the centrifugal switch opens which is at 2400 r.p.m. When the centrifugal switch 198 opens, the contacts 194 and 196 are no longer connected together and, therefore, the relay coil 178 is not shorted and becomes energized and the motor is therefore shifted to four-pole operation. It will be appreciated that, at this time, the spin shift relay coil 214 is not energized so that the transmission is in its 40 to 1 transmission ratio causing a low tumbling speed of the tumbling drum. The motor now operates at 1725 r.p.m. and the tub will be driven at approximately 43 r.p.m.

Where an intermediate or low-speed spin as desired for the drum 32, the switch contactor 236 is caused to become engaged with contact 238 and the switch contactor 206 is caused to engage contact 210. With contactor 236 engaging contact 238 and contactor 206 engaging contact 210, the motor will then accelerate to 3450 r.p.m. under two-pole operation since relay coil 178 will be de-energized. The tub will be driven at 86 r.p.m. During this time, the resistor 228 is being heated by current flow therethrough and, after five seconds of operation as a two-pole motor, the contactor 226 will engage contact 230 to short out the resistor 228 and thus provide a circuit to actuate relay coil 214 to shift the transmission and also to move contacts 212 and 213 into engagement with contacts 216 and 218. When contact 212 engages contact 216, a circuit is completed for the relay coil 178 which causes the motor to be shifted to its four-pole operation.

The motor then operates as a four-pole motor with the transmission shifted to its high-speed position. The motor will operate at 1725 r.p.m. and this will be reflected as 216 r.p.m. tub speed through the transmission which now operates at an 8 to 1 ratio. The motor will continue to operate as a four-pole motor with the transmission shifted as long as the timer contact 236 engages contact 238 and timer contactor 206 engages timer contactor 210. During the four-pole motor operation, the motor will operate at 1725 r.p.m. and the tub will be rotated at 216 r.p.m. During the tumble operation, which has been described hereinbefore and with the transmission not shifted, the motor speed is 1725 r.p.m. but the tub speed will be 43 r.p.m.

When it is desired to effect a final or high-speed spin operation of the tub 32, the timer contactor 236 is caused to become disengaged from contact 238 and the timer contactor 206 is caused to become engaged with timer contact 210. This final or high-speed spin will give a tub speed of approximately 431 r.p.m. with the motor operating at 3450 r.p.m. as a two-pole motor. This final spin may follow the 43 r.p.m. tumble cycle or may follow the intermediate or low-speed spin cycle.

Where the high-speed spin cycle immediately follows the intermediate speed spin cycle, it is preferred that the timer contactor 206 remain engaged with contact 210. This will cause the relay coil 178 to be de-energized and the motor to operate in its two-pole condition. It is seen that there is no circuit that may be completed for relay coil 178, and therefore, the motor accelerates as a two-pole motor with contactors 164 and 172 engaging contacts 168 and 174. As the motor attains its running speed, the transmission then will translate the 3450 r.p.m. two-pole motor speed to 431 r.p.m. high-speed spin for the tub 32 with a speed ratio of 8 to 1.

It will be appreciated that, in the cases of either intermediate spin speed or high-speed spin, the motor is electrically shifted to two-pole operation to accelerate the motor prior to shifting of the transmission to shift the speed ratio. In other words, the motor is electrically shifted prior to mechanical shifting of the transmission. This arrangement greatly reduces the torque load applied to the motor and thus reduces the size of the motor needed to spin a given load. This method drastically reduces the motor torque requirement for acceleration to a fixed top spin speed compared to what it would have to be if the motor were required to accelerate the tub from tumble speed in the condition where the transmission was shifted immediately following the tumble cycle; that is, without benefit of electrical shifting of motor speed prior to mechanical ratio shift.

If the tub becomes unbalanced during either the high-speed spin cycle or the intermediate spin speed cycle, the unbalance switch 156 is caused to be bumped to its open position to shut off the motor and the tub coasts of its own inertia until power is restored with balanced tub load.

Figure 4:
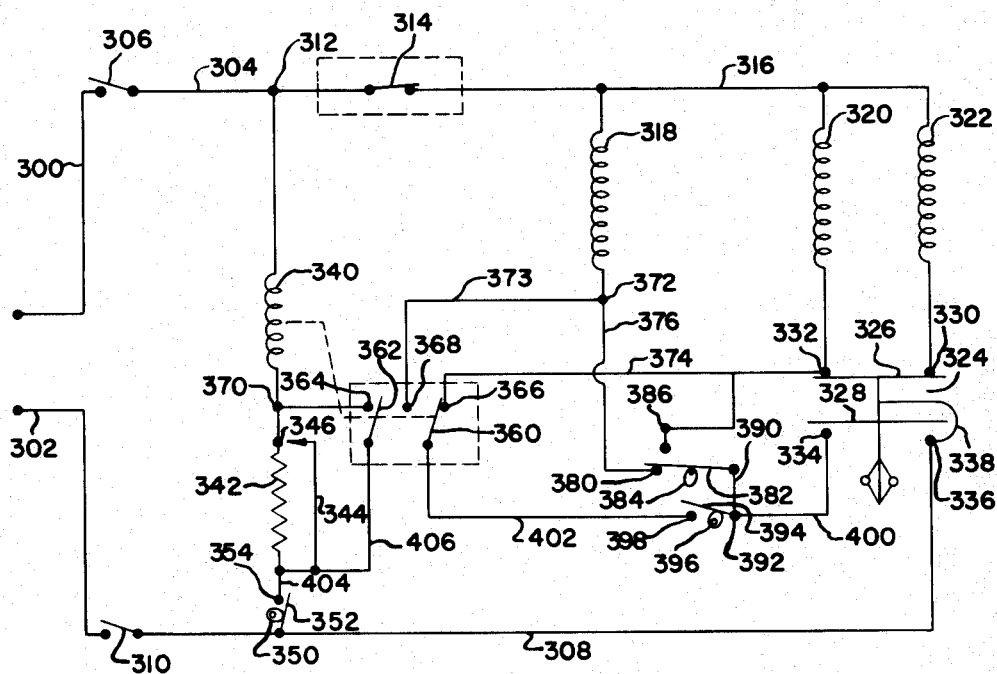
FIGURE 4 is still another modified control circuit for the electric motor and two-speed transmission illustrated in FIGURE 1.

Referring now to FIGURE 4, still another modified circuit arrangement for driving the tub of a washing machine and controlling the transmission is illustrated. This circuit works substantially identical with the circuit illustrated in FIGURE 3, but is shown for use with a two-pole/four-pole induction motor of conventional construction having a two-pole run and two-pole start winding and a four-pole run winding. As illustrated in FIGURE 4, the lead lines or lead wires that form the input terminals of the circuit are designated by reference numerals 300 and 302. These two lead wires are adapted to be connected with a source of 115 volt A.C. voltage. The lead wire 300 is connectable with lead wire 304 through a switch designated by reference numeral 306. In a like manner, the lead wire 308 is connectable with lead wire 302 through a switch designated by reference numeral 310. The lead wire 304 is connected with a junction 312 and to one side of an unbalance switch designated by reference numeral 314. This unbalance switch 314 corresponds to the switch designated by reference numeral 62 in FIGURE 1, and, as has been set forth hereinbefore, operates to open when the tub encounters an unbalanced condition. At all other times, the switch 314 remains in its closed position. The opposite side of the bump or unbalance switch 314 is connected with a lead wire designated by reference numeral 316. The lead wire 316 is connected with one side of a four-pole run winding designated by a reference numeral 318. The motor for driving the tub further includes a two-pole run winding designated by reference numeral 320 and a two-pole start winding that is designated by reference numeral 322. It is seen that the three motor windings 318, 320 and 322 are all connected with lead wire 316.

A centrifugal switch generally designated by reference numeral 324 is illustrated and comprises a pair of contactors 326 and 328 that are movable in accordance with motor speed. The centrifugal switch may be of any conventional type that responds to speed of the motor and, for example, contactor 326 becomes disengaged from contacts 330 and 332 whenever the motor speed reaches 2400 r.p.m. When this speed is attained, the contactor 328 also substantially simultaneously becomes engaged with contacts 334 and 336. It is noted that contact 336 is connected with both contactors 326 and 328 by a lead 338. The centrifugal switch, for example, moves back to short contacts 332 and 330 when the motor speed declines to 1500 r.p.m.

The circuit of FIGURE 4 further includes a relay coil designated by reference numeral 340 which is connected in series with a time delay switch having a heating resistance designated by reference numeral 342 and a movable contactor 344 which moves in response to heating of resistance 342. The movable contactor 344 normally remains out of engagement with contact 346 but, when the heating element 342 is energized for approximately five seconds, the contactor 344 is caused to engage the contact 346. The resistance 342 is connected with lead wire 308 through a timer operated switch including a cam 350 and a movable contactor 352. The movable contactor 352, at times, engages fixed contact 354 and the opening and closing of the contactor is controlled by the timer cam 350. It will be apparent from FIGURE 4 that the relay coil 340 is connected in series with the time delay heater 342 and in series with the fixed contact 354 that is engaged by timer operated contactor 352.

The relay coil 340 operates a pair of contacts simultaneously designated by reference numerals 360 and 362. The contactor 362 cooperates with fixed contact 364 whereas the contactor 360 cooperates with fixed contacts 366 and 368. In the de-energized position of relay coil 340, the contactor 360 engages the contact 366 whereas contactor 362 is disengaged from all fixed contacts. When relay coil 340 is energized sufficiently, it causes the contactor 362 to engage contact 364 and causes the contactor 360 to become engaged with contact 368. The fixed contact 364 is connected with junction 370 whereas the fixed contact 368 is connected with junction 372. The fixed contact 366 is connected with a lead wire 374 which is, in turn, connected with junction 332. The junction 372 is connected to one side of the four-pole run winding 318 and is also connected with a wire 376 that is, in turn, connected to a fixed contact 380 that is, at times, engaged by a movable contactor 382. The contactor 382 is another timer operated contact and is operated to various positions by a timer cam designated by reference numeral 384. The contactor 382 is adapted, at different positions of the timer cam 384, to contact the contact 380 and to become engaged with contact 386. At other times, the timer operated contactor 382 does not engage either contact 380 or contact 386.

The fixed timer contact 386 is connected with lead wire 374 whereas the contactor 382 is connected with a lead wire 390. The lead wire 390 is connected with a junction 392 and this junction is connected with a movable timer operated contactor 394 operated by timer cam 396. The contactor 394, at times, engages fixed contact 398 during predetermined time increments of operation of the timer. The junction 392 is connected with a lead wire 400 which is, in turn, connected with contact 334. The fixed timer contact 398 is connected with a lead 402 which is connected with relay operated contactor 360. The relay operated contactor 362 is connected with junction 404 via a lead 406.

In the circuit of FIGURE 4, the coil 340 is the transmission shifting solenoid. When this coil is de-energized, a speed ratio of 40 to 1 is set up between the motor and the tub. When coil winding 340 is energized, a speed ratio of 8 to 1 is set up between the motor and the tub.

When it is desired to effect a low-speed tumbling operation of 43 r.p.m. for the tumbling drum 32, the timer is constructed to cause the contactor 352 to become disengaged from contact 354 and to cause timer contactor 394 to become disengaged from fixed contact 398. The timer contactor 382, under this condition of operation, is caused to engage fixed contact 380. When the timers have caused the switch contactors to be set, as has been just set forth, the motor is started as a two-pole motor with both the two-pole run winding 320 and the two-pole start winding 322 being energized. The four-pole run winding is not energized at this time as there is no circuit completed between contacts 334 and 336 of the centrifugal switch. The motor now accelerates as a two-pole motor until 2400 r.p.m. speed is reached, at which time centrifugal switch contact 326 disengages from contacts 330 and 332 and contactor 328 engages contacts 334 and 336 causing de-energization of two-pole windings 320 and 322 and energization of four-pole winding 318. The transmission is not energized for high speed operation at this time because the relay coil 340 that controls the transmission cannot be energized through open contact 352. The motor will accelerate as explained above, under two-pole start condition until the centrifugal switch opens contacts 332 and 330 and shorts contacts 334 and 336. When contacts 334 and 336 become shorted, a circuit is completed for the four-pole run winding 318 that may be traced from line 316, through the four-pole run winding 318, through lead wire 376, through timer contact 382, through lead wire 400 and thence through centrifugal switch contactor 328 to lead wire 308. When the centrifugal switch has shorted contacts 334 and 336, which occurs at 2400 r.p.m., the motor will be reconnected to run as a four-pole motor having a speed of 1725 r.p.m. and causing the tub to be rotated at 43 r.p.m. due to the 40 to 1 transmission ratio of the transmission. The motor will then continue to tumble the clothes contained therein or go through a tumbling cycle as long as the timer operated switches are in the particular position just set forth.

Where an intermediate spin cycle or low speed spin cycle for the washing machine is desired, the timer contactor 382 is caused to become disengaged from contact 380 but is not caused to be engaged with contact 386. In addition, the contact 352 is caused to become engaged with contact 354 and timer operated contactor 394 is caused to become engaged with contact 398. This intermediate spin cycle follows immediately after the tumble cycle and the motor accelerates as a two-pole motor with the two-pole run winding 320 and the two-pole start winding 322, both being energized through relay operated contact 360 and timer operated contact 394. The motor will accelerate as a two-pole motor until the time delay resistance 342 causes the contactor 344 to engage fixed contact 346. As the motor is accelerating as a two-pole motor, a circuit is complete for the time delay resistance 342 through the timer contact 352 which is now engaged with fixed contactor 354. The relay coil 340 is not energized sufficiently to cause contacts 360 and 362 to shift from their positions shown in FIGURE 4 until the contactor 344 shorts out the time delay resistance 342. After the prescribed time delay of 5 seconds has occurred, the relay coil 340 is energized sufficiently to cause the shifting of contactors 360 and 362 into engagement respectively with fixed contacts 368 and 364. The shifting of contact 360 breaks the circuit for a two-pole operation and completes a circuit for a four-pole run winding so that the motor now operates as a four-pole motor. The transmission shifting coil 340 simultaneously shifts the transmission ratio and contactors 360 and 362. The motor will now operate during the intermediate spin cycle at 1725 r.p.m. and with an 8 to 1 transmission ratio the tub will be driven at 216 r.p.m. It will be apparent that the tub will continue to be driven at its intermediate spin speed and, with the motor operating as a four-pole motor as long as the timer operated switches are set for this mode of operation.

For high speed spin operation of the tub or tumbling drum 32, the timer operated contactor 382 is caused to engage contact 386 while the timer operated contactor 352 engages contact 354 and timer operated contactor 394 is caused to be out of engagement with contact 398. If the high speed spin cycle immediately follows the intermediate spin cycle, the contactor 352 remains engaged with contact 354, and contactor 394 disengages from contact 398 simultaneously with the engagement of contactor 382 with contact 386 resulting in the energization of two-pole winding 320. The motor accelerates as a two-pole motor. The tub will then be driven at 431 r.p.m. due to the fact that the motor operates as a two-pole motor and the ratio remains 8 to 1. During this two-pole running operation, the two-pole winding 320 is energized via lead 374, through contact 386, through contactor 382, through lead 390 and thence through the centrifugal switch contactor 328 which shorts contacts 334 and 336. The spin shift solenoid or coil 340 that operates the transmission to cause its high speed position is initially energized via timer operated switch contact 352 and through the contactor 344 of the time delay switch during the spin operations. When the contactor 362 engages the contact 364, a circuit is completed around the time delay heater 342 so that it is effectively shorted out of the circuit and this route maintains solenoid 340 energized during the balance of spin operations.

It can be seen from an inspection of FIGURES 2, 3 and 4 that all of these circuits have a common operation in at least one respect which is namely the fact that mechanical shifting of the transmission does not take place until the motor is intentionally overspeeded with the transmission remaining in its low speed position. In other words, with the tumbling drum being operated at 43 r.p.m. tumbling speed, the same transmission ratio is maintained during the time that the motor is intentionally overspeeded prior to shifting of the transmission to its higher speed ratio. It has been found that this greatly reduces the torque load imposed upon the motor by the tumbling drum and is an important feature of this invention.

In the foregoing description, it is seen that in FIGURES 3 and 4, the control circuits provide for a tumbling speed of approximately 43 r.p.m., an intermediate spin speed of approximately 216 r.p.m. and a high spin speed of approximately 431 r.p.m. It will be appreciated that these values of speed might be changed without departing from the spirit and scope of this invention. In addition, it will be appreciated that the various spinning speeds of the tumbling drum 32 might take place in various sequences to allow versatility in machine operation.

Figure 5:
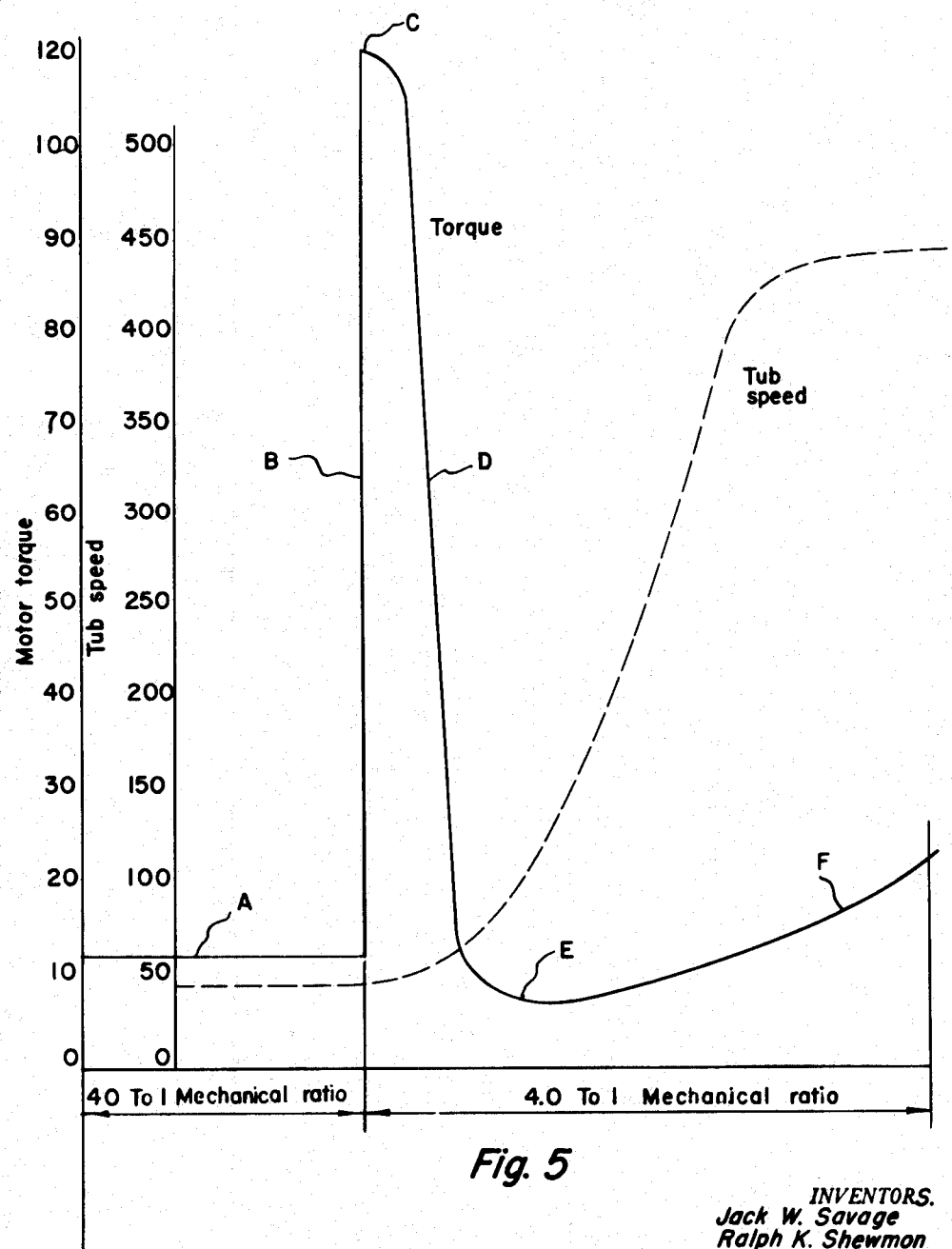
FIGURE 5 is a chart illustrating the torque required of an electric motor to accelerate a load wherein the transmission is shifted prior to the load being accelerated through its critical speed.

Referring now to FIGURE 5, the torque load imposed on an electric motor under certain operating conditions is depicted. Relating FIGURE 5 to a washing machine of the type described hereinbefore, it is seen that the motor torque requirement for tumbling in the 40 to 1 transmission ratio is relatively low. The portion of this curve designated by the letter "A" corresponds to the condition where the tub is being driven at a low tumbling speed which is below the critical speed that distributes the clothes. The speed of the tub is constant as well as the torque output of the motor as is clearly evident from FIGURE 5.

Assuming now that the transmission connected between the motor and tub is shifted to provide 4 to 1 speed ratio, it is seen that the motor torque required for driving the tube load increases instantaneously with the shifting of the transmission mechanical advantage along line "B" to a peak designated by the letter "C." This increase in torque requirement is due to the loss of mechanical advantage which has been reduced by 10 to 1. When the tub has been accelerated through the critical centrifugal distribution speed the torque requirement falls off sharply along line "D" to a point designated by the letter "E" and then gradually increases along line "F" because of the increasing friction and windage loss due to increasing speed of the spinning mass. The peak torque requirement illustrated in FIGURE 5 is eliminated with this invention as can be seen from an inspection of FIGURE 6.

Figure 6:
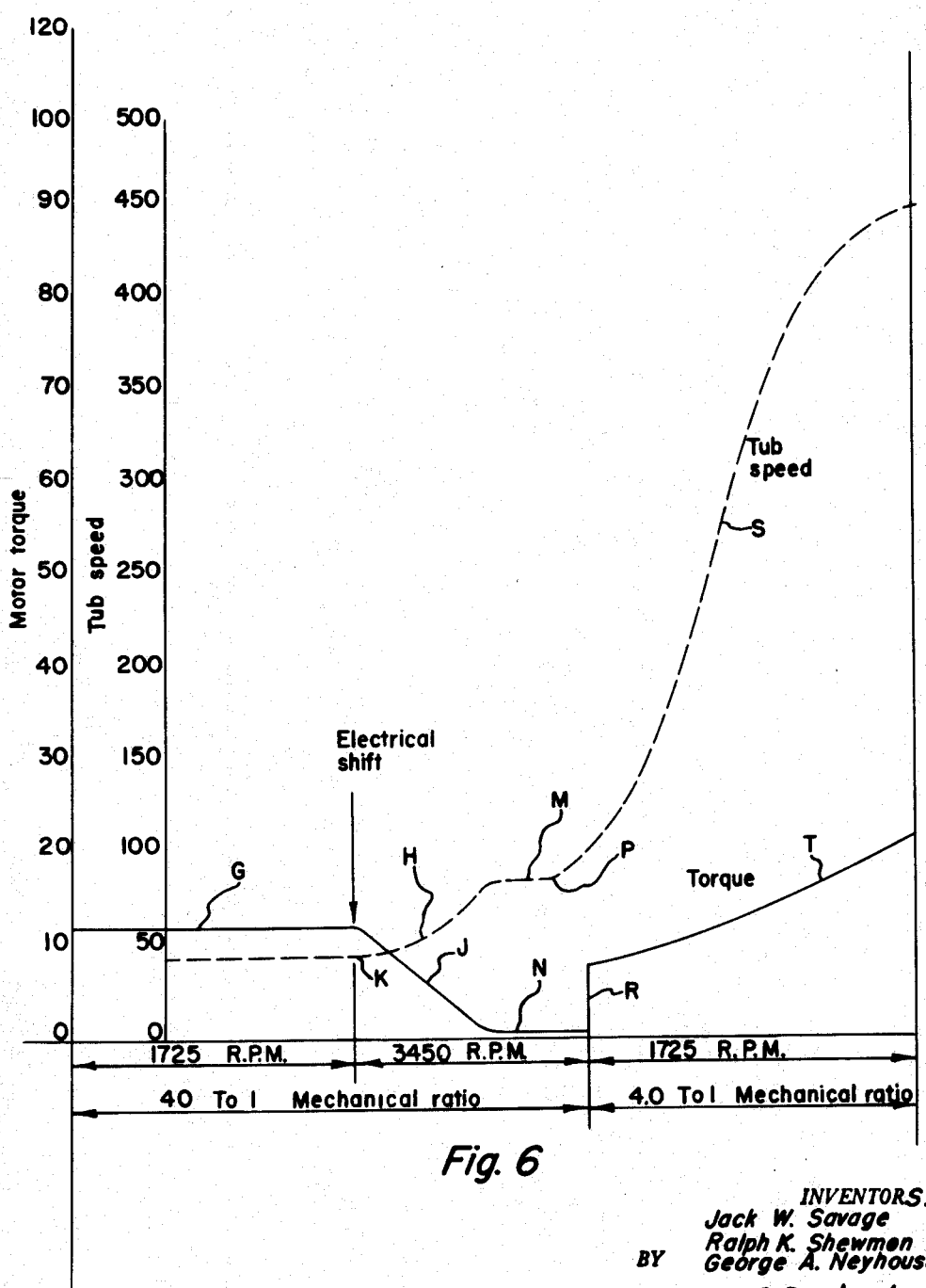
FIGURE 6 is a chart illustrating the torque required of an electric motor to accelerate a load when the principles of this invention are employed for accelerating the load.

Referring now to FIGURE 6, the torque load imposed on an electric motor driving a machine similar to that discussed in FIGURE 5 but employing the principles of this invention is depicted. In FIGURE 6 the portion of the torque curve designated by the letter "G" corresponds to the condition of operation where the tub is driven at tumbling speed with the motor operating four-pole (1725 r.p.m.) and the transmission set to provide a 40 to 1 speed ratio between the motor and tub. It is seen that tub speed is constant as well as torque output of the motor according to the teaching of this invention.

When it is desired to accelerate the tub toward a high spin speed the transmission is not immediately shifted but, rather, the motor speed is increased to 3450 r.p.m. by changing the motor to two-pole operation. The increasing of tub speed is thus accomplished by increasing the speed of the motor while maintaining the transmission at a favorable 40 to 1 speed ratio between the motor and tub. The tub now increases its speed along the portion of the tub speed curve designated by the letter "H" and during this time, the motor torque requirement follows the portion of the torque curve designated by the letter "J." During this acceleration, the tub is accelerated through its critical speed so that the clothes become distributed as a mass against the inner wall of the tub between point "K" and the beginning of the portion of the curve designated as "M." The tub speed finally levels off along the portion of the speed curve designated by the letter "M" and the motor torque requirement at this time is along the portion of the torque curve designated by the letter "N."

The motor will now drive the tub at a constant speed along the portion of the speed curve designated by letter "M." Following centrifugal clothes distribution as described hereinbefore, the transmission is shifted to its 4 to 1 ratio. The shifting occurs after acceleration of the motor has driven the tub to twice tumble speed and is depicted as point "P" on the speed curve of FIGURE 6. The motor torque requirement increases along line "R" at the instant the transmission is shifted due to the loss of mechanical advantage and the motor is shifted to four-pole operation which will give an ultimate motor speed of 1725 r.p.m. The speed then increases along line "S" while the motor torque increases slightly along line "T."

In comparing the motor torque curves of FIGURES 5 and 6, it is clearly apparent that the high peak torque of FIGURE 5 has been completely eliminated with this invention. This is attributable to accelerating the load through its critical speed by increasing the speed of the motor while the transmission remains in its more favorable mechanical advantage setting. With the arrangement of this invention, it is possible to use motors of smaller size and peak power demands are reduced.

It should be pointed out that the motor speed could be increased in ways other than by changing the number of effective poles when it is desired to accelerate a load through its critical speed, for example, by changing the frequency input to the motor. This invention, in its broad aspects, thus contemplates increasing the speed of the motor through the critical speed range without regard to how the motor speed is changed. It will, of course, be appreciated that doing this by changing the number of effective poles is a simple and effective manner of accomplishing the result desired.

It will also be apparent that, although this invention has been illustrated in connection with a washing machine, it has equal applicability to any type of device wherein a load is driven that exhibits a sharp decrease in torque requirement after a critical speed is exceeded.

While the embodiments of the invention as herein disclosed constitute preferred forms, it is to be understood that other forms might be adopted.

What is claimed is as follows:

1. In combination, a driven load exhibiting a sharp decrease in torque requirement at a critical speed, an electric motor operable at a first speed of rotation and a second higher speed of rotation, transmission means connected between said motor and said load for driving said load at a first speed and at a second speed that is higher than said first speed, means for causing said motor to operate at its first low speed output while maintaining said transmission means in its first low speed mode of operation, means for causing said load to be driven in excess of its critical speed including means for causing said motor to accelerate to said second higher speed while maintaining said transmission means in said first low speed mode of operation, and means for causing said tranmsission means to shift to said second higher speed mode of operation after said motor has attained and is operating at said second higher speed.

2. In combination, a load exhibiting a sharp decrease in torque requirement at a critical speed, an electric motor having a field circuit capable of operating with a first given number of effective poles and with a second greater number of effective poles to provide multi-speed operation, transmission means having a low speed output and a higher speed output connected between said motor and said load, electrically energizable means for shifting said transmission means from its low speed output to said higher speed output when energized, a power circuit adapted to be connected with a source of voltage, means for connecting said field circuit with said power circuit to cause said motor to operate at its greater number of effective poles while maintaining said electrically energizable means disconnected from said power circuit to provide low speed for said load, means for connecting said field circuit with said power circuit to cause said motor to operate at its lesser number of effective poles while maintaining said electrically energizable means disconnected from said power circuit, and means for causing sufficient energization of said electrically energizable means to provide for shifting of said transmission means to its higher output speed immediately after said motor has accelerated the load above its critical speed and when said motor is operating with its lesser number of effective poles.

3. In combination, a washing machine having a rotatable tub, an electric motor having a low speed output and a higher speed output, transmission means connected between said electric motor and said tub having a low speed output and a higher speed output, means for causing said electric motor to operate at its low speed output while maintaining said transmission means in its low speed output, means for causing said electric motor to operate at its higher speed output while maintaining said transmission means in its low speed output mode of operation, means for shifting said transmission to its higher speed output after said motor has operated for a predetermined time at its higher speed output and during the time it is operating at said higher speed, and means for shifting said motor back to its low speed output substantially simultaneously with the shifting of said transmission means to its higher speed output.

4. In combination, a washing machine having a rotatable tub, an electric motor having a field circuit including means for operating said motor at a first number of poles and for operating said motor at a greater number of poles, two-speed transmission means connected between said electric motor and said tub including electrically energizable means for shifting said two-speed transmission means from its low speed output to a higher speed output, a power circuit, means for connecting the field circuit of said electric motor with said power circuit in such a fashion that said motor operates at its greater number of effective poles while maintaining said electrically energizable means disconnected from said power circuit, means for connecting the field circuit of said electric motor with said power circuit so as to cause said electric motor to operate at its lesser number of poles whereby the motor is accelerated, means for preventing sufficient energization of said electrically energizable means to cause shifting of said transmission when said motor is accelerating under its lesser number of poles, and means for shifting said transmission to its higher speed output after a predetermined time interval following the connection of said motor with its lesser number of poles and during the time that the motor is operating with its lesser number of poles, said last named means comprising a time delay switch means connected in series with said electrically energizable means.

5. In combination, a washing machine having a rotatable tub, an electric motor including a field circuit that is connectable to provide a first number of effective poles and a second greater number of effective poles whereby the motor is operable as a two-speed motor, two-speed transmission means connected between said electric motor and said rotatable tub including electrically energizable means for shifting said transmission from its low speed output to a higher speed output, a power source, means for connecting the field circuit of said electric motor with said power source so as to provide the greater number of effective poles and low speed output of the motor while maintaining said electrically energizable means not energized sufficiently to cause shifting of said transmission to its higher speed output, means for connecting the field circuit of said electric motor with said power source so as to bring into effect the lesser number of poles while maintaining said electrically energizable means not energized sufficiently to cause shifting of said transmission to its higher speed output, and means for causing said transmission means to be shifted to its higher speed output after a predetermined time interval following the connection of said motor with its lesser number of poles and during the time that the motor is operating with its lesser number of poles, said last named means comprising a time delay switch connected in series with said electrically energizable means and having a predetermined time delay for sufficiently energizing said electrically energizable means.

6. In combination, a load exhibiting a sharp decrease in torque requirement at a critical speed when said load is accelerated through said critical speed, the combination comprising, an electric motor, transmission means connected between said motor and load operative to provide a varying speed ratio between the motor and load, means for driving said load at a speed lower than said critical speed including means for causing operation of said motor at a first speed while said transmission means is set to provide a first speed ratio between said motor and load, means for causing said load to be accelerated through said critical speed including means for increasing the speed of said motor above said first speed while maintaining said transmission means in its said first speed ratio, and means for operating said transmission means to increase the speed ratio between said motor and load only after said load has been accelerated to a speed exceeding said critical speed and during the time that said load is operating at said speed exceeding said critical speed.

References Cited in the file of this patent
UNITED STATES PATENTS

| | | |
|---|---|---|
| 2,717,698 | Armstrong | Sept. 13, 1955 |
| 2,881,633 | Warhus | Apr. 14, 1959 |